Figure 1:
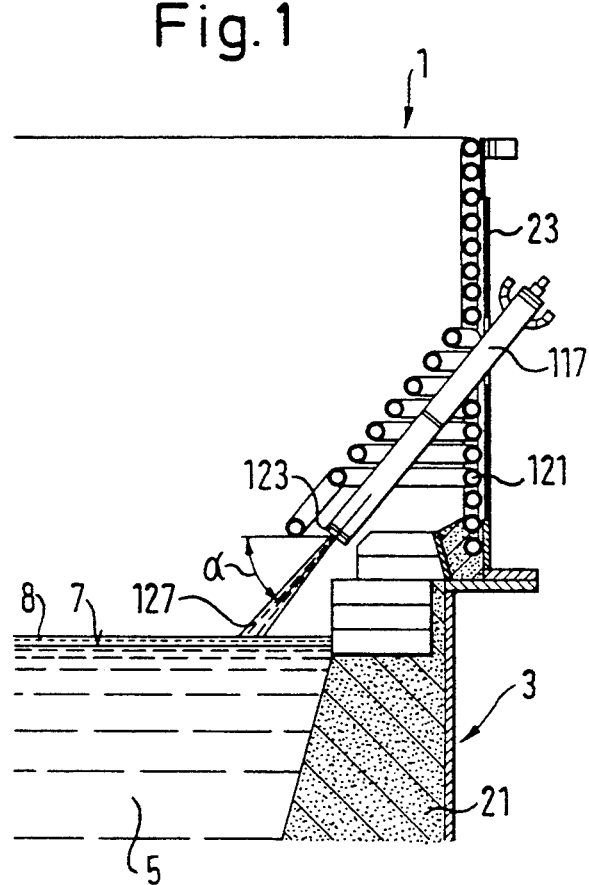

United States Patent

Knapp et al.

[11] Patent Number: 5,332,199
[45] Date of Patent: * Jul. 26, 1994

[54] METALLURGICAL VESSEL

[75] Inventors: Hubert Knapp, Bühl; Peter Hoffman, Schwelm, both of Fed. Rep. of Germany

[73] Assignee: Fuchs Systemtechnik GmbH, Wellstatt-Legelshurst, Fed. Rep. of Germany

[*] Notice: The portion of the term of this patent subsequent to Jan. 22, 2008 has been disclaimed.

[21] Appl. No.: 750,908

[22] Filed: Aug. 28, 1991

[30] Foreign Application Priority Data

Sep. 5, 1990 [EP] European Pat. Off. ........ 90117098.5

[51] Int. Cl.⁵ .............................................. C21C 5/32
[52] U.S. Cl. ..................................... 266/225; 266/270
[58] Field of Search ............ 266/182, 186, 189, 193, 266/217, 221, 225, 226, 270, 268; 373/75, 76

[56] References Cited

U.S. PATENT DOCUMENTS

| 4,696,013 | 9/1987 | Ehle et al. .............................. 373/83 |
|---|---|---|
| 4,986,847 | 1/1991 | Knapp et al. .......................... 75/527 |

FOREIGN PATENT DOCUMENTS

| 8102165 | 8/1981 | European Pat. Off. ............. 266/225 |
|---|---|---|
| 140401 | 5/1985 | European Pat. Off. ............. 266/193 |
| 1304418 | 3/1982 | France . |
| 2489841 | 3/1982 | France . |
| 2634787 | 2/1990 | France .............................. 75/10.41 |
| 1161808 | 8/1969 | United Kingdom . |
| 2115011 | 9/1983 | United Kingdom . |

*Primary Examiner*—Melvyn J. Andrews

[57] ABSTRACT

Apparatus for supplying a molten metal (5) in a metallurgical vessel (3) with a gas and fine-grain solid materials comprising a water-cooled first lance (117) for the supply of the gas and a second lance (119) for the supply of the solid materials. The supply of the solid materials is effected in such a way that, after leaving the outlet opening of the second lance (119), the materials are deflected by the gas (127) issuing from the outlet opening of the first lance (117), and are fed with said gas to the molten metal (5). The lances are inserted through the side wall of the vessel (3).

15 Claims, 1 Drawing Sheet

METALLURGICAL VESSEL

The invention relates to a metallurgical vessel comprising means for supplying a molten metal in said vessel with a gas and fine-grain solid materials.

It is known for example to supply oxygen to a molten metal by way of a water-cooled first lance, for the combustion of carbon or carbon-bearing compounds. A lance that kind may be introduced into the vessel as required manually or by way of a controllable manipulator, and can be arranged or moved within the vessel in a predeterminable fashion. It is also known for a molten metal to be supplied for example with fine-grain carbon for example for carburisation purposes or for supplying energy or for promoting the formation of a slag above the molten metal. In addition, for the purposes of promoting the formation of a foam slag, it is known for a molten metal to be supplied with fine-grain solid materials such as for example lime, dolomite or bauxite or the like, acting as slag-forming agents. In the known process the solid materials are supplied example by way of an opening in the cover of the vessel or by way of a charging door, and are conveyed by pneumatic means. That procedure suffers from the disadvantage that only a part of the solid materials supplied passes into the region of the molten metal or the layer of slag which is formed above it. On the one hand, that results in a high level for consumption of solid materials while on the other hand it also means that the effect which is intended to be achieved by the introduction of the solid materials occurs only incompletely or with a delay. Furthermore, the combustion of volatile components of the fine-grain solid materials supplied may result in the undesirable generation of gas in the vessel, and that in turn can mean that solid materials introduced therein to leave the vessel together with gas, without the solid materials having passed into the region of the molten metal. An undesirable consequence of that, apart from the wastage of energy, is for example also an additional loading on the filter or dust-removal installation arranged downstream of the vessel.

The inventors have already proposed (U.S. Pat. No. 4,986,847) a metallurgical vessel comprising a first lance having a first outlet opening for supplying gas into said vessel, a second lance having a second outlet opening for supplying fine-grain solid material into said vessel, said lances being arranged such that said outlet openings extend inclinedly at a predetermined angle relative to each other, the first outlet opening being located above the second outlet opening. The two lances are connected in fixed association with each other to a manipulator with which they can be moved into and out of the vessel through an opening which is usually provided in the side wall of the vessel and closable by a door.

In case of the invention described in the earlier filed application the solid materials are supplied in the form of a delivery stream by way of a second lance in such a way that, after leaving the outlet opening of the second lance, the solid materials are diverted by gas issuing from the outlet opening of the first lance, and are fed to the molten metal with said gas.

The use of a second lance for supplying the solid materials in the form of a delivery stream means that they can be fed to the molten metal in a specific and controlled fashion and without substantial proportions of the solid materials supplied being lost to the environment within the vessel. A specific and controlled action on the molten metal, for example in a restricted local region and with a depth of penetration into the molten metal, is achieved in that, after issuing from the second lance, the delivery stream is deflected by the gas and is fed together with the gas to the molten metal. The feed of solid materials together with the gas further provides that gases and solid materials are already mixed while they act on the molten metal, and that facilitates the occurrence of chemical reactions between the gas and the solid materials or with the molten metal or the layer of slag.

In that connection it has been found advantageous for the gas to issue from the first lance at a speed which is in the supersonic range. In that connection it is particularly advantageous for the gas to issue at about 2.5 times the velocity of sound. In that connection, solid materials to be supplied are transported along by the gas in particularly good fashion and are entrained for example through a layer of slag which has been formed, to the surface of the molten metal, or into a region within the molten metal. It is possible in that situation to achieve for example a depth of penetration of about 5 cm to 8 cm.

The stream of solid material which may have for example air or an inert gas the transportation medium advantageously issues from the outlet opening of the second lance at a velocity of 20 m/s to 50 m/s. The solid materials are then entrained in the direction of the gas by the transportation medium. Without being passed to the molten metal, the latter can escape into a region of the vessel which is above the molten metal, so that it does not affect the procedure involved in the chemical reactions in the region of the molten metal.

Oxygen is supplied as the gas for fining a molten metal.

Depending on the effect to be achieved, the solid materials used may be fine-grain carbon or fine-grain slag-forming agents such as lime, limestone, bauxite, dolomite and/or metallurgical agents for treatment of the molten metal.

It has been found advantageous for the solid materials to be used to be furnace dusts such as for example untreated filter dusts and/or scale or unreduced ores or sintered products thereof.

It is advantageous for gas and/or solid materials to be supplied intermittently by way of the lances. In that way gas and/or solid materials can be supplied in a specific and controlled fashion in dependence on the nature of the treatment to be carried out or the condition of the molten metal or scrap which is not yet melted in the vessel.

If as in case of the earlier proposal of the inventors the lances are inserted through the usual opening in the side wall of the vessel then air is entrained through this opening into the vessel when gas and fine-grain solid materials are supplied via the lances to the molten metal bath. This impairs the atmosphere within the vessel by nitrogen from the air.

It is an object of the invention to provide a metallurgical vessel with means for supplying a gas and fine-grain solid materials into a molten metal contained in said vessel without a part of the solid materials while same are being supplied, being lost by drifting away into regions of the vessel which are remote from the molten metal.

It is a further object to avoid access of air during this process through a hole in the furnace wall through which the pair of lances are inserted in order to avoid any impairment of the atmosphere in the interior of the vessel and in order to enhance the effectivity of the process. The object of the invention is achieved by a metallurgical vessel comprising a bottom portion for receiving a molten metal bath and a side wall portion formed by a plurality of circumferentially arranged side wall panels, a first lance having a first outlet opening for ejecting gas towards said bottom portion of said vessel, a second lance having a second outlet opening for supplying fine-grain solid material into said vessel, said lances being passed through said side wall portion and being arranged such that the direction of ejection gas of from said first outlet opening is inclined downwardly at a predetermined angle $\alpha$ relative to a horizontal plane, and that the direction of ejection of solid material from said second outlet opening intersects the direction of ejection of said first outlet opening above the maximum level of the molten metal bath with at a predetermined angle $\beta$.

In case of the metallurgical vessel according to the invention each of these lances is inserted through its own hole provided in the side wall of the vessel and any gap between the outer wall of the respective lance and the inner wall of the respective hole can be closed by fireproof material. Therefore the oxygen jet blown into the molten metal bath does not entrain any nitrogen from the air outside of the vessel so that the effectivity of the process is increased.

It is possible to install the lances shiftable in a longitudinal direction. Usually it is, however, sufficient to fix the lances in a predetermined position within a wall panel. In order to avoid any damage of the tips of the lances when charging material into the vessel or under the influence of the radiation of the arcs the lances are at least partially screened relative to the interior of the vessel by a water cooled shield which is preferable formed in a bay like manner as a part of the side wall panel.

One or more pairs of lances may be arranged in a distributed array over the circumference of the vessel.

Figure 2:
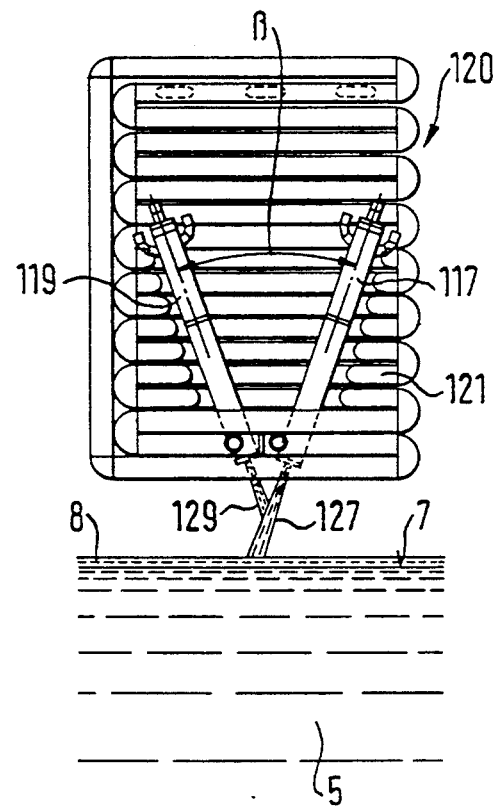
Figure 3:
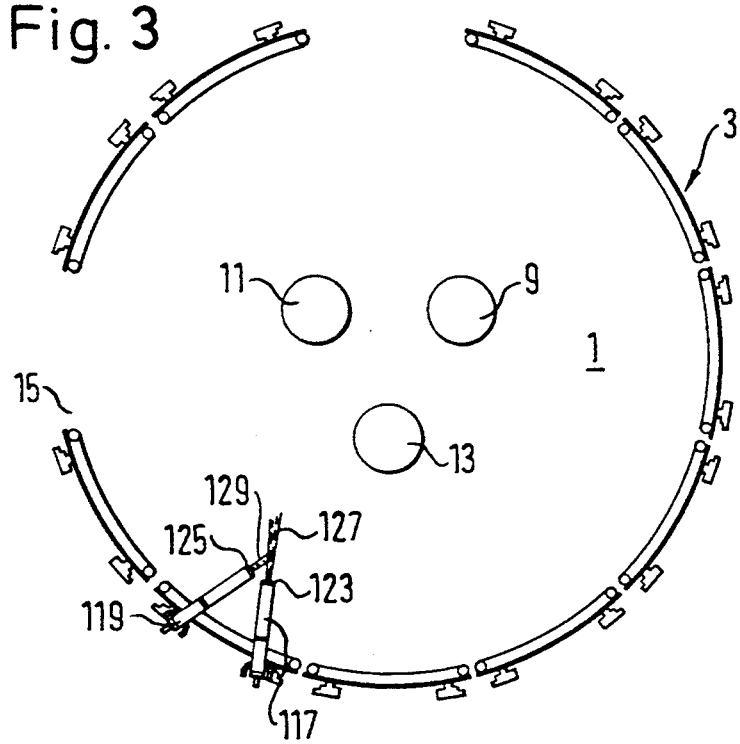

The invention is described more in detail with reference to the accompanying drawings which show incomplete diagramatic views and in which:

FIG. 1 is a partly section side view of an electric arc furnace comprising means for supplying a molten metal in the vessel of said furnace with a gas and fine-grain solid materials, FIG. 2 is an incomplete front view of the means shown in FIG. 1, from the outside of the vessel, and FIG. 3 is a schematically plan view of the furnace shown in FIG. 1.

In the embodiment illustrated in FIGS. 1 to 3 an electric arc furnace which is generally identified by reference numeral 1 includes a melting vessel 3 in which there is a molten metal bath 5, on the surface 7 of which there is a layer of slag 8 which is not shown in greater detail. Illustrated in FIG. 3 are the positions of three electrodes 9, 11 and 13 which are mounted on support arms in known manner which is therefore not described herein, and which can be passed into the interior of the vessel 3 by way of openings in a cover thereof.

At a lateral position the vessel 3 has an opening 15 which is closable by a door (not shown). The vessel consists of a container portion 21 for receiving the molten metal bath and of a side wall portion 23 positioned above the molten metal bath and formed by a plurality of circumferentially arranged side wall panels 120. The side wall portion 23 is located above the container portion 21 such that the side wall portion 23 is above the highest level normally attained by the molten bath within the container 21.

First and second metal-cooled lances 117 and 119 are passed through a side wall panel 120, at an angle $\alpha$ with respect to the horizontal plane (see FIG. 1), with the two lances being suitably associated with each other. Cooling pipes 121 are disposed in the side wall panel 120, partially extending around the two lances 117 and 119. In that way the two lances 117 and 119 are at least partially protected from the effect of heat from the arcs or the molten metal 5.

The angle $\alpha$ at which the two lances 117 and 119 extend with respect to the horizontal plane is about 50°; that ensures that fine-grain solid materials and gases which are introduced by way of the lances 117 and 119 can satisfactorily penetrate through the layer of slag 8.

The two lances 117 and 119 are of a substantially straight extending configuration and they are each arranged to extend at approximately the same angle with respect to a central plane which passes between the two lances 117 and 119, with an angle $\beta$ (see FIG. 2) being formed between the two lances 117 and 119 which extend towards each other in a V-shaped configuration towards the molten metal 5.

The two substantially straight lances 117 and 119, each have outlet regions 123 and 125 which extend in the longitudinal direction of the respective corresponding lance. The first lance 117, serves to supply a gas, for example oxygen, while the second lance 119, serves to supply the molten metal 5 with fine-grain solid materials which can be conveyed for example by means of air or inert gas as a transportation medium. The gas 127 which issues from the outlet opening 123 of the first lance 117 substantially maintains its direction towards the surface 7 of the molten metal 5. By virtue of the arrangement of the two lances 117 and 119, the delivery stream 129 issuing from the outlet opening 125 of the second lance 119 impinges on to the gas 127. In that situation, the delivery stream 129 is deflected out of its original direction because of the higher velocity of the gas 127, the direction of which remains substantially unchanged. Fine-grain solid materials which are supplied by way of the second lance 119 are thus conveyed into the molten metal 5, with the gas 127 which issues from the first lance 117. The positional arrangement of the first and second lances 117 and 119 can be altered by way of variations in the angles $\alpha$ and $\beta$, in accordance with a desired region in which a molten metal bath 5 or a layer slag 8 to be penetrated is to be acted upon by the gas and the solid materials. The angle $\alpha$ is preferably in the range from 40° to 70°. The angle $\beta$ is preferably in the range from 40° to 60°.

The arrangement of a first and second lances 117 and 119 means that for example oxygen together with carbon as the fine-grain solid material can be fed specifically and in a controlled fashion to a locally delimited area of the molten metal 5, and a plurality of such pairs of first and second lances 117 and 119 can possibly be arranged in a distributed array around the circumference of the vessel 3. Moreover it is also possible for one or more pairs of lances 117 and 119 to be associated with a melting vessel 3 or an electric arc furnace 1, to provide that the molten metal 5 is acted upon by gas and solid materials in a specific controlled fashion.

By the provision of suitable wall panels 120, it is possible for an already existing electric arc furnace or melting vessel to be subsequently fitted with the arrangement of the first and second lances 117 and 119.

The expression lances, used in this application comprises lances as well as tuyeres arranged in a way described above.

We claim:

1. Metallurgical vessel adapted for supplying fine-grain solid material to a molten metal bath from above the surface thereof, said vessel comprising:

a container portion for receiving a molten metal bath and a side wall portion positioned above a highest level normally attained by the molten bath within the container portion, the side wall portion being formed by a plurality circumferentially arranged side wall panels, a first lance having a first outlet opening for ejecting gas towards said container portion of said vessel, a second lance having a second outlet opening for supplying fine-grain solid material into the container portion of said vessel, said lances being passed through said side wall portion such that the outlet openings of the lances are located above the highest level normally attained by the molten bath within the container portion, said lances being arranged at an acute angle $\alpha$ relative to the horizontal and an angle $\beta$ relative to one another, said angle $\beta$ having a vertex located above said highest level whereby fine-grain solid material supplied from said second outlet opening intersects the path of ejection of gas from said first outlet opening at said vertex of angle $\beta$, and whereby said material is deflected and carried by said gas toward the container portion.

2. Metallurgical vessel according to claim 1, wherein said angle $\alpha$ is in the range from 40 degree to 70 degree.

3. Metallurgical vessel according to claim 1, wherein said angle $\beta$ is in the range from 40 degree to 60 degree.

4. Metallurgical vessel according to claim 1 wherein said first and second lances are substantially straight.

5. Metallurgical vessel according to claim 4, wherein said first lance is arranged in a vertical plane.

6. Metallurgical vessel according to claim 4, wherein said second lance passes that side wall portion in about the same height as said first lance.

7. Metallurgical vessel according to claim 1, wherein a plurality of pairs of first and second lances are arranged around the circumference of the vessel.

8. Metallurgical vessel according to claim 1, wherein said first lance is provided with a Laval nozzle.

9. Metallurgical vessel according to claim 1, wherein said lances comprise channels for a fluid.

10. Metallurgical vessel according to any of claims 1 to 9, wherein there is at least one pair of first and second lances and each said pair is at least partially screened relative to the interior of the vessel by a water cooled shield.

11. Metallurgical vessel according to claim 10, wherein said shield is in the shape of a bay projection inclined towards the bottom portion of the vessel.

12. Metallurgical vessel according to claim 10, wherein said shield is formed by a plurality of water cooled pipes arranged side by side.

13. The vessel according to claim 1, further comprising holes in said side wall for allowing passage of the lances therethrough, wherein said first and second lances each pass through separate holes.

14. Metallurgical vessel adapted for supplying fine-grained solid material to a molten metal bath from above the surface thereof, said vessel comprising:

a container portion for receiving a molten metal bath and a side wall portion positioned above a highest level normally attained by the molten bath within the container portion, the side wall portion being formed by a plurality circumferentially arranged side wall panels, a first lance having a first outlet opening for ejecting gas towards said container portion of said vessel, a second lance having a second outlet opening for supplying fine-grain solid material into the container portion of said vessel, said lances being passed through said side wall portion such that the outlet openings of the lances are located above the highest level normally attained by the molten bath within the container portion, said lances being arranged at an acute angle $\alpha$ relative to the horizontal and an angle $\beta$ relative to one another, said angle $\beta$ having a vertex located above said highest level whereby fine-grain solid material supplied from said second outlet opening intersects the path of ejection of gas from said first outlet opening at said vertex of angle $\beta$, and whereby said material is deflected and carried by said gas towards the container portion, and a water cooled shield arranged around said pair of first and second lances, said water cooled shield being formed integrally with a side wall panel, which panel comprises two holes for the insertion of said lances.

15. Metallurgical vessel adapted for supplying fine-grained solid material to a molten metal bath from above the surface thereof, said vessel comprising:

a container portion for receiving a molten metal bath and a side wall portion positioned above a highest level normally attained by the molten bath within the container portion, the side wall portion being formed by a plurality circumferentially arranged side wall panels, a first lance having a first outlet opening for ejecting gas towards said container portion of said vessel, a second lance having a second outlet opening for supplying fine-grain solid material into the container portion of said vessel, said lances being passed through said side wall portion such that the outlet openings of the lances are located above the highest level normally achieved by the molten bath within the container portion, said lances being arranged at an acute angle $\alpha$ relative to the horizontal and an angle $\beta$ relative to one another, said angle $\beta$ having a vertex located above said highest level whereby fine-grain solid material supplied from said second outlet opening intersects the path of ejection of gas from said first outlet opening at said vertex of angle $\beta$, whereby said material is deflected and carried by said gas towards the container portion, and a water cooled shield arranged around said pair of first and second lances, said water cooled shield being inclined downwardly towards the bottom portion of said vessel at said angle $\alpha$.

* * * * *